Sept. 10, 1940.　　　L. A. KOCH, JR　　　2,214,532

BUMPER EXTENSION

Filed June 9, 1938

INVENTOR
Louis A. Koch Jr.,
BY John L. Milton
ATTORNEY

Patented Sept. 10, 1940

2,214,532

UNITED STATES PATENT OFFICE 2,214,532

BUMPER EXTENSION

Louis A. Koch, Jr., Louisville, Ky., assignor, by mesne assignments, to American Chain & Cable Company, Inc., New York, N. Y., a corporation of New York Application June 9, 1938, Serial No. 212,777

13 Claims. (Cl. 293—55)

My invention relates to improvements in a vertical extension for a vehicle bumper, and particularly concerns an auxiliary member for increasing the lateral area protected thereby.

My invention further concerns the construction of the auxiliary member, and the means for securing the same to a horizontal bumper bar.

My invention also concerns an improved construction for fixedly securing the auxiliary member to the vertical extension.

In the preferred embodiment of my invention, I provide a stamped elongated sheet-metal body having a continuous peripheral flange projecting rearwardly from the front face thereof, thus forming a cup-shaped impact receiving body for engaging, along a portion of its edges, with the front face of a horizontal bumper bar.

In the portions of the flange forming the longitudinal sides of the body, aligned notches are provided near the uppermost end thereof, for receiving an auxiliary member, which notches serve to retain the auxiliary member in a fixed, spaced-relation with respect to the horizontal bumper bar, and to provide a recess within which the auxiliary member is secured to the sheet-metal body. In the aforesaid longitudinal sides, additional notches are provided, in the lower portion of the bumper engaging edges, for also receiving the auxiliary member. These additional notches serve to clamp the auxiliary member between the sheet-metal body and the front face of the horizontal bumper bar, so that a portion of the auxiliary member will overlie the front face of the bumper bar and receive material reinforcement by the inter-engaging relation.

Thus, it is to be observed that one form of my auxiliary member assumes an annular shape, in which the uppermost portion thereof is secured in the aligned notches formed in the sides near the uppermost end of the sheet-metal body, and in which the lower portion of the annular member is disposed within the additional notches and clamped between the sheet-metal body and the front face of the bumper bar by the same clamping means serving to secure the sheet-metal body to the bumper bar.

It will therefore be obvious that the principal object of my invention is to fixedly secure the auxiliary member to the vertical bumper-bar extension in spaced relation with respect to the bumper bar, with the auxiliary member projecting laterally from the vertical extension to increase the lateral area protected by the vertical bumper extension.

It will be further obvious that another object of my invention is to provide a bumper attachment that is inexpensive in construction, rigid in character, extremely durable in use, and which may be quickly installed on a bumper bar without requiring alteration of the bumper construction.

Other objects of my invention will become apparent when the following description is read in conjunction with the accompanying drawing, in which.

Figure 1:
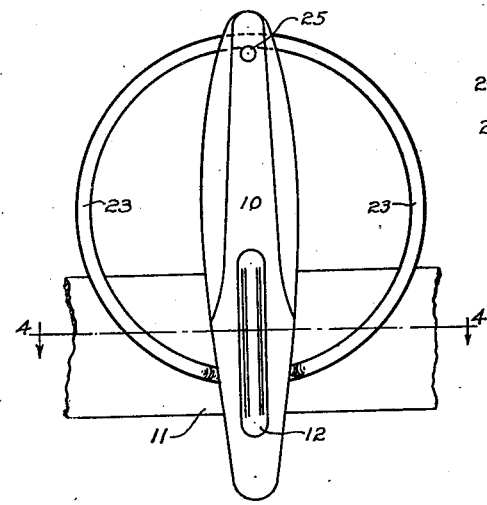
Figure 1 is a front elevational view of a part of a bumper bar with my bumper extension mounted thereon.

Referring now to Figure 1, the numeral 11 designates a horizontal bumper bar of a vehicle. For preventing damage to parts of the vehicle, particularly by movement of a bumper bar or other parts of a second vehicle either over or under the bumper bar 11, a vertical extension 10 is provided, which extension projects above and below the bumper bar 11. The vertical extension is stamped from sheet-metal, and, generally, is of hollow construction. This hollow construction is obtained by providing a marginal flange 101 projecting rearwardly from the front face of the vertical extension. The provision of this flange materially increases the strength of the extension, and provides side walls for concealing certain parts.

Since the bumper bars now generally in use have an arcuate transverse section, it will be observed that I have formed that portion of the rear edges of the longitudinal flanges 101, which engage the bumper bar 11, so as to conform with the transverse contour thereof. This construction is particularly illustrated in Figure 2.

Figure 2:
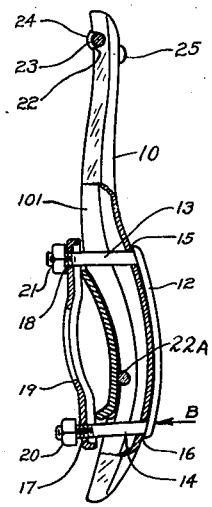
Figure 2 is a side view of Figure 1, and is shown partially in section.

For securing the vertical extension 10 to the bumper bar 11, the front wall of the extension is provided with a pair of apertures 15, 16 that are spaced longitudinally thereon. A U-bolt B is also provided, and is assembled with the extension 10 so that its yoke portion 12 extends longitudinally along the front face of the extension with its legs 13, 14 projecting rearwardly through the corresponding apertures 15, 16 so as to straddle the bumper bar 11 to which the extension 10 is secured. A clamping plate 19 is also provided for engaging the rear side of the bumper bar 11, which clamping plate has apertures 18 and 17 formed therein through which the legs 13, 14 of the U-bolt B pass. With reference to Figure 2, it will be observed that the clamping plate 19 is held against the rear side of the bumper bar 11 by nuts 21 and 20 on the legs 13, 14 of the U-bolt. This construction is disclosed in a copending application Serial Number 128,311, filed March 1, 1937, by Norman W. Cummins now Patent No. 2,178,138, October 31, 1939.

Figure 3:
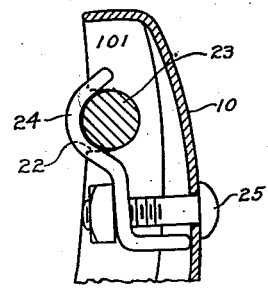
Figure 3 is a partial section taken along the vertical center line of Figure 1, for showing the means for securing the auxiliary member to the vertical bumper extension.

Referring now to Figures 1, 2 and 3 it will be observed that I have provided aligned notches 22 in the longitudinal side portions of the marginal flange 101 near the upper end thereof. Similarly, referring to Figs. 1, 2, 3, 4, and 7 it will be observed that I have also provided aligned notches 22A in the longitudinal side-portions of the marginal flanges 101 near the lower end of the bumper bar seat.

Figure 4:
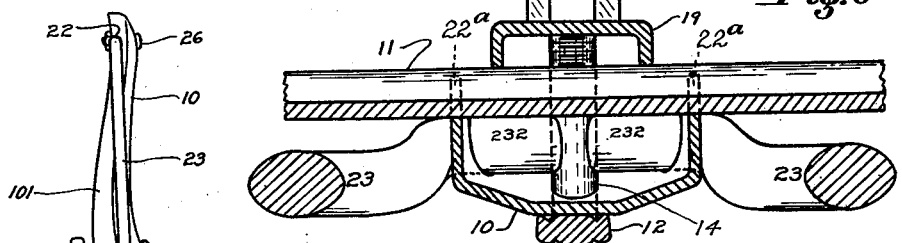
Figure 4 is a sectional view taken along line 4—4 of Figure 1.
Figure 5:
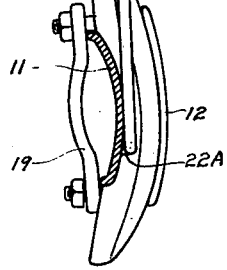
Figure 5 is a side elevational view of another construction for my bumper extension showing the ring member secured within the notches by a bolt.
Figure 7:
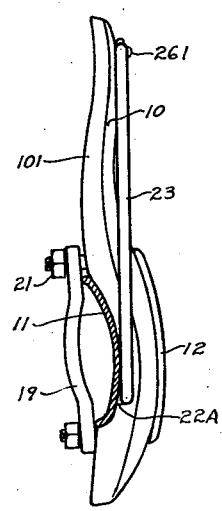
Figure 7 is a side elevational view of still another construction for my bumper extension showing the ring secured on the front face of the extension by a bolt; and, Figure 8 is an enlarged partial elevational view of the upper end of Figure 7, showing the details of the securing bolt.

In the preferred embodiment of my invention I employ a ring-shaped member 23 having its free ends 232 substantially abutting, and disposed within the aligned notches 22A. As illustrated in Figures 4, 5 and 7, the ends 232 are slightly offset, and the notches 22A are constructed and arranged to fixedly clamp the ends 232 against the front face of the bumper bar 11, when the extension 10 is clamped thereto by the U bolt B and associated parts. With reference to Figures 1, 2 and 3 it will be observed that the uppermost portion of the ring-shaped member 23 is disposed within the aligned notches 22, and secured to the extension 10 by a metal clamp 24 and bolt 25. Thus, the upper-portion of the ring shaped member is retained in fixed, spaced-relation from the bumper bar by reason of the inter-engaging relation of the aligned notches 22 therewith.

Figure 6:
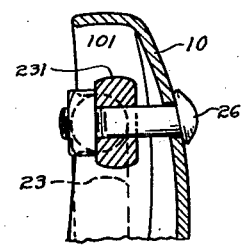
Figure 6 is an enlarged sectional view of the upper end of Figure 5, showing the details of the securing bolt.

In Figures 5 and 6, the portion 231 of the ring-shaped member 23, which is disposed between the aligned notches 22, is flattened, and provided with a suitable aperture through which a bolt 26 passes for securing the same to the extension 10.

Figure 8:
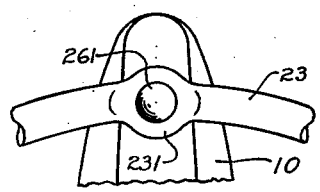

In Figures 7 and 8 the aligned notches 22 are omitted, and the flattened portion 231, of the ring-shaped member 23, is shown overlying the front face of the extension 10 and secured thereto by a bolt 261.

While I have illustrated the auxiliary member 23 of my preferred embodiment as having a ring-shaped construction, with the free ends 232 substantially abutting and clamped within aligned notches 22A between the extension 10 and front face of the bumper bar 11, it is to be understood that I advocate changes in the shape of the auxiliary member from that illustrated with the free ends projecting symmetrically from either side of the extension 10 and fixedly secured directly to the bumper bar 11 independently of the extension 10. Therefore, I do not desire to be limited to the specific structure illustrated in my preferred embodiment other than that indicated in the appended claims.

Having thus described my invention, I claim:

1. An auxiliary vertical extension for a horizontal bumper bar of a vehicle comprising, a rigid member for projecting above the bar, said member having rearwardly extending flanges and recesses formed in the flanges; a second member for projecting generally upwardly above said bar, said second member being embraced by said recesses; and means for securing said members to said bar.

2. A guard structure to be secured to a horizontal bumper bar of a vehicle, comprising, an auxiliary guard member; an elongated sheet-metal stamped body having a front face plate and a continuous peripheral flange projecting rearwardly therefrom, thus forming a cup-shaped impact-receiving body for engaging along a portion of its longitudinal edges with the front face of a bumper bar, the said flange having aligned notches formed in the longitudinal edges thereof, remote from the bumper-engaging edges, for receiving the said auxiliary member in fixed, spaced-relation with respect to the said bumper-engaging edges; and means cooperating with the said notches for securing the said auxiliary member to the said stamped body.

3. A bumper guard structure, comprising, an elongated impact-receiving member projecting vertically above a horizontal bumper bar of a vehicle and having rearwardly extending flanges, the said flanges having aligned notches formed therein near the upper end of said elongated member; an auxiliary impact-receiving member embraced by the said notches; and means fixedly securing the said auxiliary member to the said elongated member.

4. A bumper guard structure, comprising, an elongated impact-receiving member having a front face and a continuous peripheral flange projecting rearwardly therefrom, the said flange having two sets of aligned notches formed in the longitudinal edges thereof; a ring-shaped impact-receiving member embraced by the said notches at substantially diametrically opposed points thereof; means, cooperating with one set of the said notches, for fixedly securing the said ring-shaped member to the said elongated member; and means clamping the portion of the said ring shaped member, embraced by the other set of said notches, between the said elongated member and the front face of a horizontal bumper bar of a vehicle.

5. A bumper guard structure, comprising, an elongated impact-receiving member having a front face and a continuous peripheral flange projecting rearwardly therefrom, the said flange having two sets of aligned notches formed in the longitudinal edges thereof; a ring-shaped impact-receiving member embraced by the said notches at substantially diametrically opposed points thereof; and means for securing the said members to a horizontal bumper bar of a vehicle.

6. A bumper guard structure, comprising, an elongated impact-receiving member having a front face and a continuous peripheral flange projecting rearwardly therefrom, the said flange having notches formed in the longitudinal edges thereof; an auxiliary impact-receiving member embraced by the said notches; and means for securing the said members to a horizontal bumper bar of a vehicle.

7. The combination with a channel shaped vertical guard adapted for mounting on a horizontal bumper bar, the channel walls of said guard facing rearwardly and provided with transversely alined seats on a different horizontal level from that of the horizontal bumper bar, a transversely extending supplemental guard engaging said seats and projecting laterally beyond the sides of said vertical guard, and means for pressing said supplemental guard into frictional holding engagement with said seats.

8. The combination with a channel shaped vertical guard adapted for mounting on a horizontal bumper bar, the channel walls of said guard facing rearwardly and provided with transversely alined seats on a different horizontal level from that of the horizontal bumper bar, a transversely extending supplemental guard engaging said seats and projecting laterally beyond the sides of said vertical guard, and means for pressing said supplemental guard into frictional holding engagement with said seats comprising relatively movable elements cooperating with said vertical and supplemental guards.

9. The combination with a channel shaped vertical guard adapted for mounting on a horizontal bumper bar, the channel walls of said guard facing rearwardly and provided with transversely alined seats on a different horizontal level from that of the horizontal bumper bar, a transversely extending supplemental guard engaging said seats and projecting laterally beyond the sides of said vertical guard, and means for holding said supplemental guard in frictional engagement with said seats, said means being located between said channel walls and bearing on the portion of the supplemental guard located between said walls.

10. The combination with a channel shaped vertical guard adapted for mounting on a horizontal bumper bar, the channel walls of said guard facing rearwardly and provided with transversely alined seats on a different horizontal level from that of the horizontal bumper bar, a transversely extending supplemental guard engaging said seats and projecting laterally beyond the sides of said vertical guard, and means for holding said supplemental guard in frictional engagement with said seats, comprising relatively adjustable elements cooperating with the bottom section of the channel of said vertical guard and with said supplemental guard element.

11. The combination with a channel-shaped vertical guard adapted for mounting on the front face of a horizontal bumper bar, the channel walls of said guard extending rearwardly and provided with seats for a supplemental guard located at a point above said bumper bar, of a supplemental guard engaging said seats and secured therein and projecting laterally beyond the sides of said vertical guard and downwardly into horizontal overlapping relation with said bumper bar to be secured thereto.

12. The combination with a channel shaped vertical guard adapted for mounting on the front face of a horizontal bumper bar, the channel walls of said guard extending rearwardly and having positioning means for a supplemental guard located at a point above said bumper bar, of a supplemental guard engaging said positioning means and projecting laterally of said vertical guard and downwardly into overlapping relation with said bumper bar to be secured thereto.

13. The combination with a channel shaped vertical guard adapted for mounting on a horizontal bumper bar, the channel walls of said guard facing rearwardly and provided with transversely aligned seats on a different horizontal level from that of the horizontal bumper bar, a transversely extending supplemental guard engaging said seats and projecting laterally beyond the sides of said vertical guard, and means securing said supplemental guard to said seats.

LOUIS A. KOCH, Jr.